3,205,211
POLYMERIZATION OF CONJUGATED DIOLEFINS
Richard W. Kibler, Cuyahoga Falls, and Thomas B. Talcott, Wadsworth Township, Medina County, Ohio, assignors to The Firestone Tire & Rubber Company, Akron, Ohio, a corporation of Ohio
No Drawing. Filed Sept. 29, 1960, Ser. No. 59,164
6 Claims. (Cl. 260—94.2)

This invention relates to the production of rubbery polymers of conjugated diolefins such as isoprene, 1,3-butadiene and piperylene, and more particularly to an improved process and a novel catalyst effective to produce a rubbery polyisoprene containing polymeric units essentially in the cis-1,4-configuration For more than half a century the polymer art has attempted to produce a synthetic polymer which would simulate the characteristics of natural Hevea rubber. Hevea rubber, produced biochemically in the *Hevea brasiliensis* in a manner other than by polymerization of monomeric isoprene, nevertheless exhibits the structure of a cis-1,4-polyisoprene polymer. Accordingly, the natural rubber polymer is crystalline and its vulcanizate is characterized by such desirable properties as high tensile strength, low permanent set, low hysteresis, and the like. It was not until quite recently that any significant progress has been made toward the development of a so-called synthetic natural rubber.

In recent years it has been discovered that certain catalysts are stereo-specific in their ability to polymerize various diolefins and to produce therefrom polymers which, depending upon the particular catalysts and the reaction conditions, are characterized by an essentially cis-1,4-configuration. Among the earlier catalysts to be discovered was the lithium-type catalyst, it being determined that metallic lithium and various lithium hydrocarbons were effective in the production of essentially cis-1,4-polyisoprenes. Catalysts of the Ziegler type then were found to have similar utility, such catalysts usually being a complex of an organo metallic reducing compound and a tetrahalide or trihalide of a transition metal. While making a signal advance in the direction of synthesizing extremely high cis-1,4-isoprene, the lithium-type catalysts have usually required low polymerization temperatures in order to preserve the desired microstructure, and Ziegler catalysts have also required low temperatures to maintain the desired molecular weight of the polymers. Since it is generally commercially more desirable to conduct such polymerization reactions at higher temperatures, the art is desirous of developing catalysts which will produce high molecular weight rubbery polymers having the desired microstructure, without the refrigeration or close temperature control presently necessary.

Accordingly, it is an object of the present invention to provide a catalyst and a polymerization process employing such catalyst which will permit consistent production of an essentially cis-1,4-polyisoprene rubber at temperatures higher than those now employed by the art.

It is also an object to produce rubbery, highly linear polymers of conjugated diolefins including isoprene, 1,3-butadiene, and piperylene, mixtures of any of these, and mixtures with a copolymerizable alpha olefin (such as styrene) in which the diolefin (or diolefins) predominates. Another object is to provide synthetic rubbery polymers having inherently high light stability.

It is a further object of the invention to provide a process for the production of a catalyst effective to produce essentially cis-1,4-polyisoprenes at temperatures higher than those now employed by the art. An additional object of the invention is to provide an improved polymerization catalyst effective to produce essentially cis-1,4-polyisoprene at temperatures in the order of 60° C. and above.

Generally described, the present invention is directed to a process for polymerizing a conjugated diolefin to a rubbery, linear polymer and is especially directed to polymerizing isoprene to produce an essentially cis-1,4-polyisoprene, which comprises contacting the monomer with a lithium-modified carbon black catalyst. Preferably catalyst concentrations between about 0.001 and 0.1 part of carbon bound lithium as lithium-modified carbon black per 100 parts by weight of monomer are employed. The corresponding carbon level in the catalyst is about 0.03 to 3.0 parts per 100 parts of monomer.

The novel lithium-modified carbon black catalysts employed in the process of the invention preferably is prepared by reacting a halogenated carbon black with finely divided lithium metal on a stoichiometric ratio of two atoms of lithium to one of halogen under conditions suitable to replace halogen with lithium at halogenated reactive sites of the carbon black. Alternatively, a halogenated carbon black can be reacted with an alkyl lithium such as ethyl, butyl or amyl lithium. Of the halogens, chlorine and bromine are preferred, although iodine and fluorine are operable. Astatine, because of its ephemeral and transitory existence is not a preferred halogenation agent. The lithium halide formed may be removed from the lithium modified carbon black, if desired, but ordinarily is allowed to remain with the lithium modified carbon black catalyst.

The carbon black is halogenated by direct reaction with the halogen at elevated temperature, or by reaction with any known halogenating reagent. The carbon black can be advantageously reacted with chlorine by heating the black to a temperature between about 250 and 350° C. in the presence of chlorine gas until the desired degree of halogenation is achieved. The halogenated carbon black can be reacted with lithium or alkyl lithium at room temperature, or at temperatures between about 10 and 150° C. until the desired reaction is obtained. Depending on the nature and reactivity of the starting carbon black, the lithium-modified carbon black catalyst of the invention usually contains from about 0.15 to about 4% of active lithium. Analysis of the catalyst of the invention shows it to contain little or no uncombined lithium. Substantially all of the active lithium present in the catalyst appears to be carbon-bound, by analysis, and this is also indicated by the method of making the catalyst, i.e., by reaction of lithium with carbon containing chemically bound halogen. Thus, the active lithium of the cataylst is chemically combined lithium.

The novel lithium-modified carbon black cataylst of the invention is not to be mistaken for lithium carbide. Carbon black is known to consist essentially of carbon atoms arranged in condensed six-membered rings and contains at its reactive sites functional groups such as —H, $$-\overset{|}{C}=O$$

—COOH, and =O. It is at such reactive sites that chlorination occurs, usually between about 10 and 15% by weight depending on the reactivity of the particular black. Somewhat higher reactivity can be obtained even in the most active blacks by attriting in a ball mill or milling between tight, heated rolls. The more reactive blacks are preferred for preparation of the catalysts of the invention. Examples of commercial reactive carbon blacks include the rubber reinforcing blacks (e.g., SAF, ISAF, HAF, HPC, MPC and EPC blacks, and acetylene blacks) the various known ink blacks and the semi-reinforcing blacks (SRF and other "filler" blacks for rubber). The carbon blacks contemplated are the rubber-reinforcing carbon blacks.

In employing the catalyst and process of the invention, polymerization temperatures of at least about 60° C. are preferred, and are especially desirable for the production in significant yields and reasonable polymerization times of a polyisoprene having an essentially cis-1,4-microstructure. The isoprene polymers produced by employing the process and the catalyst of the invention are at least the equivalent of the high cis-1,4-polyisoprenes produced previously by the art and, in addition, have been found to have considerably enhanced light stability, perhaps as a result of the carbon black (from the catalyst) introduced into, and chemically combined with, the polymer.

THE POLYMERIZATION PROCEDURE AND PROPERTIES OF THE POLYMERS

For small scale laboratory preparations, the polymerization reactions may conveniently be carried out in glass bottles sealed by crown caps lined with aluminum foil or other flexible, inert sheet material. Before use, the bottles should be dried, for instance by flaming and flushing with helium, argon or other inert gas. It is often desirable, even though the isoprene and solvent (if used) have been previously purified, to subject the materials to a last purification before charging, as for instance by passage through a silica gel adsorption column during the charging. Preferred solvents are aliphatic and aromatic hydrocarbon solvents such as n-butane, pentane, cyclopentane, hexane, cyclohexane, heptane, petroleum ether, kerosene, benzene, toluene, xylene, and the like. An atmosphere of inert gas such as helium, argon or the like can be maintained in the bottle during the charging, to avoid contact of oxygen with the monomer, and it will usually be desirable to complete the purging of oxygen from the system by allowing a portion of the isoprene (or other diolefin monomer) to evaporate with the bottle loosely capped. The composite catalyst, which will usually be in the form of a readily flowable suspension of the catalyst, is usually introduced last, just before sealing the crown cap. A hypodermic syringe is a convenient instrument for handling the catalyst, since it will keep the catalyst out of contact with the atmosphere. The sealed bottle may either be placed on a polymerizer wheel, arranged to dip and revolve the bottle in a water bath at the desired polymerization temperature; or the contents can be mixed with a magnetic stirrer in a medium maintained at the desired polymerization temperature. The polymerization will usually be complete in from 3 to 90 hours, depending on the temperature, catalyst concentration and other pertinent conditions. Polymerization temperatures usually will be maintained between about 60° C. and 150° C., and preferably between about 60° C. and about 100° C.

It is usually necessary to cut open the bottle to remove the polymer. Since the polymer contains no antioxidants, it is extremely susceptible to oxidation. A preferred method of shielding the polymer from oxidation consists in dropping it into a methanol, isopropanol or other alcoholic solution of an antioxidant and agitating the mixture. The alcohol serves as a vehicle for distributing the antioxidant, as an agent to destroy the catalyst, and causes the polymer to separate out from any solvent used in the polymerization reaction. The separated polymer is then preferably washed with water on a roll mill, usually with addition of further stabilizing agents, and dried.

Corresponding techniques can be used in large scale polymerizations according to this invention. Usually the reaction will be carried out in a closed autoclave provided with a heat-transfer jacket and with a rotary agitator. Avoidance of oxygen contamination is most easily secured by evacuating the autoclave prior to charging the isoprene (or other diolefin) and solvent (if used) and evaporating and venting a portion of the charge to sweep out any traces of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. Upon completion of the polymerization, the polymerization mass is removed, immersed under the surface of a body of methanol, isopropanol or other alcohol containing an antioxidant, and agitated therewith to precipitate the polymer, destroy the catalyst and incorporate the antioxidant throughout the body of polymer. The precipitated mass can be milled with water on a wash mill to remove the alcohol, additional antioxidant being incorporated during this operation. The product is then dried for storage and use.

The data given hereinbelow as to the proportions of cis-1,4-; trans-1,4; 1,2- and 3,4-additions in the products of this invention were determined by infra-red analysis. The relative amounts of the four structures named are found by means of measuring the intensities of the infra-red adsorption bands at 8.85, 8.68, 10.98 and 11.25 microns for the four types of structures in the order given, and inserting these values into the equation:

$$D^i = e_1^i C_1 + e_1^i C_2 + e_3^i C_3 + e_4^i C_4$$

where $D^i$=absorbance (optical density of the polymer at wave length $i$, $e^i_{1, 2, 3 \text{ or } 4}$=the absorptivities of the several structures at wave length $i$, the subscripts 1, 2, 3 and 4 referring to the several component structures, $C_{1, 2, 3 \text{ or } 4}$=the concentrations of the several structures, the subscripts 1, 2, 3 and 4 referring to the several component structures.

The four equations obtained in this way are solved for $C_1$, $C_2$, $C_3$, and $C_4$, the values of the concentrations of the cis-1,4-; trans-1,4; 1,2-addition and 3,4-addition components of the polymer.

The peak wave lengths selected, and the values of the absorptivities $e^i$ for these wave lengths for the several structures, are tabulated herewith:

|  | Molar absorptivities* $e^i$ at wave length of— | | | |
| --- | --- | --- | --- | --- |
|  | 8.68 microns | 8.85 microns | 10.98 microns | 11.25 microns |
| 1,2-addition | 3.531 | 3.531 | 149.0 | 10.199 |
| 3,4-addition | 1.541 | 1.815 | 7.363 | 145.0 |
| Cis-1,4-addition | 3.583 | 6.518 | 1.860 | 1.530 |
| Trans-1,4-addition | 5.927 | 1.934 | 2.277 | 1.885 |

*The molar unit is taken to be $C^5H^8$.

Percentage values for the various types of addition products are derived by dividing the absolute concentration of each type of component by the sum of the concentrations of the four types of components (1,2-; 3,4-; cis-; and trans-) determined and multiplying by 100%, so that the sum of the percentages given will always be 100%. A further percentage figure may be given, namely "total unsaturation found." This is the quotient of the sum of the concentrations of the various component structures found by infra-red analysis, divided by the concentration of the solution used in the analysis, which is found by determining the total solids. According to the unsaturation of the polymer, determined chemically, the total found should be about 95%. Values larger than this may be due to error, oxidation or both. Values below about 95% probably indicate that the difference between this figure and 100% represents isoprene polymerized in structures other than the cis-1,4-; trans-1,4-; 1,2- and 3,4-modes of addition; and the "net" values of the proportions of these structures will be given by multiplying the given figures by the total unsaturation found. Thus, if the cis-1,4-unsaturation is reported as 91%, and the total unsaturation found is given as 95%; then the net cis-1,4-unsaturation will be 95% of 91% or 86.4% net cis-1,4-unsaturation. The net cis-1,4-unsaturation has been found to be an important criterion of the excellence of the polymers; in general, polymers having a net cis-1,4-unsaturation of 85% or better will resemble Hevea rubber in that they will form crystalline complexes with silver nitrate, and will form vulcanizates having excellent hot strength and modulus.

The polymers of the invention can be vulcanized (singly or in admixture with other vulcanizable rubbers) by substantially the same sulfur, sulfur and accelerator, peroxide, or other systems by which conventional natural or essentially cis-1,4-polyisoprene rubbers are vulcanized, to yield products which are useful in pneumatic tires (particularly as the tread and body stocks thereof), resilient rubber mountings, torsion springs and the like.

In addition to the preceding general description of the invention, the following specific examples are presented to illustrate production of the catalyst of the invention and of high cis-1,4-polyisoprene by the process of the invention. All parts given are by weight.

*Example 1*

Sixty-seven and one-half grams of SAF carbon black (Philblack E) was placed in a 20 mm. glass tube 20 inches in length and heated in a tube furnace at a temperature of 300° C. Chlorine slowly was passed through the tube during a 24 hour period with the temperature in the tube being maintained at 300° C. The tube was then cooled and the chlorinated carbon so produced was placed on a Buchner funnel, whereupon air was drawn through the chlorinated product for a period of two hours. Very little odor of chlorine or HCl remained at the end of the two hour period. The chlorinated carbon black product was found on analysis to contain 12.7% of chlorine by weight.

Twenty-five grams of the chlorinated carbon thus formed was dried for 4 hours in an oven maintained at a temperature of 105° C. and then was placed in a 7 ounce bottle which previously had been flushed with argon. Thirty ball bearings, one-half inch in diameter, then were added to the bottle. Finally, 3.55 grams of a 35% lithium paste in petroleum jelly (containing 1.24 grams of lithium) was suspended in 125 ml. (85.5 grams) of purified n-heptane and added to the reaction bottle. The bottle then was capped and placed on a ball mill. The mixture was ball milled for a period of 19 days on a mill turning at the rate of 40 turns per minute. A 98% yield of product was obtained. Analysis established that substantially all of the active (titratable) lithium was chemically bound to carbon and amounted to 0.532%; the carbon black in the catalyst was found to be 82.8%.

*Example 2*

Following the polymerization process generally outlined above, a solution of 20 parts purified isoprene monomer and 80 parts of petroleum ether was charged into a bottle reactor. Catalyst prepared as in Example 1 containing 0.015 part lithium as lithium-modified carbon per 100 parts of isoprene was then added to the reactor. The reactor was tumbled and maintained at a temperature of 40° C. for a period of 15 hours. No reaction occurred.

*Example 3*

The procedure of Example 2 was repeated with the temperature being maintained at 70° C. for a period of 64 hours. A black, solid, tough polymer was attained in 76% conversion. Immediately after the polymer was removed from the reactor, it was drowned in methanol containing sufficient stabilizer or antioxidant to protect the polymer from oxidation. The polymer was of high molecular weight and was characterized by an inherent viscosity of 24.5. Upon infra-red analysis the polymer was found to have the following micro-structure:

|  | Percent |
|---|---|
| Cis-1,4 | 93.1 |
| Trans-1,4 | 0.0 |
| 1,2 | 0.0 |
| 3,4 | 6.9 |
| Total found | 91.0 |
| Net cis | 84.7 |

The polymer was broken down to a plastic, tacky stage by being worked on a tight rubber mill. The polymer was found to band well and to mill better than most of the synthetic high cis-1,4-polyisoprene polymers previously prepared with lithium-type catalysts. The light stability of the polymer also was found to be better than that of the high cis-1,4-polyisoprene polymers prepared with other lithium catalysts, possibly due to the presence of approximately 0.7% of carbon black in, and chemically combined with, the polymer.

*Example 4*

In order further to establish the characteristics of the lithium modified carbon black catalyst of the invention, additional polymerization reactions were conducted varying the catalyst concentration, the reaction temperature and the time of polymerization. The results are tabulated in Table I below.

TABLE I.—POLYMERIZATION OF ISOPRENE WITH LITHIUM MODIFIED CARBON BLACK

| Example | Parts of Li as Li modified carbon per 100 parts isoprene | Parts of carbon as Li modified carbon per 100 parts isoprene | Volume ratio of isoprene monomer to petroleum ether solvent | Temperature of polymerization (° C.) | Time of polymerization (hours) | Result |
|---|---|---|---|---|---|---|
| 4a | 0.016 | 0.55 | 20/80 | 50 | 57 | No polymerization. |
|  |  |  |  | 70 | 25 | Do. |
|  |  |  |  | 70 | (¹) | Solid polymer, 45.6% conversion. |
| 4b | 0.020 | 0.69 | 20/80 | 50 | 57 | No polymerization. |
|  |  |  |  | 70 | 25 | Solid polymer, 68% conversion. |
| 4c | 0.027 | 0.93 | 20/80 | 50 | 57 | No polymerization. |
|  |  |  |  | 70 | 25 | Solid polymer, 88% conversion. |
| 4d | 0.032 | 1.10 | 20/80 | 50 | 15 | No polymerization. |
|  |  |  |  | 55 | 24 | Do. |
|  |  |  |  | 60 | (²) | Solid polymer, 92.5% conversion. |
| 4e | 0.053 | 1.82 | 20/80 | 50 | 15 | No polymerization. |
|  |  |  |  | 55 | 24 | Do. |
|  |  |  |  | 60 | (²) | Solid polymer, 92.7% conversion. |

See footnotes at end of table.

TABLE I.—POLYMERIZATION OF ISOPRENE WITH LITHIUM MODIFIED CARBON BLACK

| Example | Parts of Li as Li modified carbon per 100 parts isoprene | Parts of carbon as Li modified carbon per 100 parts isoprene | Volume ratio of isoprene monomer to petroleum ether solvent | Temperature of polymerization (° C.) | Time of polymerization (hours) | Result |
|---|---|---|---|---|---|---|
| 4f | 0.034 | 1.17 | 20/80 | 60 | 15 | No polymerization. Solid polymer, 93% conversion. |
| 4g | 0.021 | 0.72 | 20/80 | 60 | 15 | No polymerization. |
|   |   |   |   | 60 | 41 | Some foaming. |
|   |   |   |   | 60 | 163 | Solid polymer, 92% conversion. |
| 4h | 0.013 | 0.446 | 20/80 | 70 | 16 | Some polymerization; solution thickened. |
|   |   |   |   | 70 | 47 | Solid polymer. |
| 4i | 0.044 | 1.51 | 20/80 | 70 | 16 | No polymerization. |
|   |   |   |   | 70 | 47 | Some polymerization; solution thickened. |
|   |   |   |   | 70 | 71 | Solid polymer. |
| 4j | 0.013 | 0.446 | 20/80 | 50 | 48 | No polymerization. |
|   |   |   |   | 70 | 16 | Do. |
|   |   |   |   | 70 | 88 | Solid polymer. |
| 4k | 0.032 | 1.10 | 20/80 | 50 | 48 | No polymerization. |
|   |   |   |   | 70 | 16 | Do. |
|   |   |   |   | 70 | 88 | Solid polymer. |

[1] Several days.  [2] 3 days

Example 5

The polymers prepared in Examples 4a through 4g were combined for compounding and evaluation in comparison with natural rubber. The compound recipe and the results obtained, in terms of physical properties, are set forth in Table II.

TABLE II.—PHYSICAL PROPERTIES OF LITHIUM MODIFIED CARBON BLACK CATALYZED POLYISOPRENE

|   | Polyisoprene prepared in accordance with the invention | Natural rubber |
|---|---|---|
| Polymer | 100 | 100 |
| HAF Black | 25 | 25 |
| Zinc oxide | 3 | 3 |
| Stearic acid | 2 | 2 |
| Softener (Tergum S) | 3 | 3 |
| Antioxidant (BLE) | 1 | 1 |
| Sulfur | 2 | 2 |
| Accelerator (Santocure NS) | 0.8 | 0.8 |
| Cure at 280° F., minutes— |   |   |
| Elongation, percent: |   |   |
| 15 | 720 | 650 |
| 30 | 720 | 635 |
| 45 | 700 | 615 |
| 60 | 600 | 595 |
| 90 | 680 | 580 |
| Modulus at 300% p.s.i.: |   |   |
| 15 | 100 | 550 |
| 30 | 550 | 1,000 |
| 45 | 675 | 1,125 |
| 60 | 725 | 1,150 |
| 90 | 650 | 1,150 |
| Tensile, p.s.i.: |   |   |
| 15 | 825 | 2,950 |
| 30 | 3,225 | 4,425 |
| 45 | 3,550 | 4,500 |
| 60 | 3,625 | 4,350 |
| 90 | 3,400 | 4,075 |
| Normal hot tensile at 275° F.; cure 45 minutes at 280° F.— |   |   |
| Elongation, percent: |   |   |
| 45 | 650 | 370 |
| 45 | 630 | 470 |
| 45 | 620 | 400 |
| 300% modulus, p.s.i.: |   |   |
| 45 | 500 | 530 |
| 45 | 490 | 660 |
| 45 | 510 | 680 |
| Tensile, p.s.i.: |   |   |
| 45 | 1,150 | 710 |
| 45 | 1,060 | 1,140 |
| 45 | 1,020 | 980 |

The data in Table II establish that in terms of physical properties the polymers of the invention are at least equal to the high cis-1,4-polyisoprene previously produced by stereo-specific catalysts currently employed by the art and closely approach or even surpass natural rubber. From the examples generally, it is apparent that the objects of the invention have been achieved and that superior polyisoprenes containing essentially cis-1,4-microstructure may be produced at desirably higher polymerization temperatures.

Highly linear, rubbery, polybutadiene can be obtained by polymerizing 1,3-butadiene in contact with the catalyst of the invention. The polymer contains above about 85% 1,4-structure, with very little branching along the polymer chains. Also piperylene can be polymerized in the presence of the catalyst of the invention to high polymers suitable for conversion by chlorination into chlorinated polypiperylene for use as resins in corrosion-resistant paints and in rubber-to-metal adhesives, for example. All polymers of the invention normally are black or gray because of the inclusion therein of about 0.1 to 3.0% by weight of carbon black chemically combined with, or linked to, the polymer, causing the polymer to be appreciably more resistant to light-catalyzed degredation than prior polymers produced by lithium polymerization.

Because the catalyst of the invention is insoluble in the diolefin monomers to be polymerized and in the hydrocarbon solvents preferred for use in the polymerization, the polymerization reaction of the invention is necessarily a heterogeneous reaction. This is in contrast to prior polymerizations in the presence of hydrocarbon lithium catalysts, such as butyl lithium, which are generally more or less soluble in the polymerization medium and probably give rise to homogeneous polymerization reactions.

Since the invention may doubtless be modified without departing from the scope thereof, it is intended that the invention be limited only by the scope of the appended claims.

1. A process for preparing a lithium modified carbon black catalyst effective to polymerize a conjugated diolefin to a rubbery polymer having essentially 1,4-structure which comprises passing chlorine over a carbon black at elevated temperatures to produce a chlorinated carbon black, and reacting finely divided lithium metal with the chlorinated carbon black until a lithium modified carbon black is attained containing from about 0.15 to about 4% by weight of lithium chemically bound to carbon.

2. A process for preparing a lithium modified carbon black catalyst effective to polymerize a conjugated diolefin to a rubbery polymer having essentially 1,4-structure which comprises halogenating a rubber-reinforcing carbon black by reacting said black with a halogen gas, and thereafter reacting the halogenated carbon black with a minor proportion of a reactant selected from the group consisting of finely divided lithium metal and an alkyl lithium.

3. A catalyst produced by the process of claim 1.

4. A catalyst produced by the process of claim 2.

5. A catalytic process for polymerizing monomer comprising a conjugated diolefin to a linear rubbery polymer of substantially 1,4-structure, comprising contacting a conjugated diolefin dissolved in an inert, liquid hydrocarbon solvent with a catalyst consisting essentially of the product of claim 2, and said catalyst containing from between about 0.15 and about 4% by weight of lithium chemically bound to carbon, said catalyst being employed in a concentration corresponding to carbon bound lithium of the catalyst of between 0.001 and 0.1 part per 100 parts of monomeric diolefin, and conducting the polymerization reaction at a temperature between about 60° and about 150° C.

6. The process of claim 5 wherein the diolefin is isoprene.

References Cited by the Examiner

UNITED STATES PATENTS

| | | | |
|---|---|---|---|
| 1,891,407 | 12/32 | Godel | 252—445 |
| 1,944,161 | 1/34 | Baxter | 252—445 |
| 2,483,886 | 10/49 | Crouch | 260—94.2 |
| 2,861,983 | 11/58 | Fotis | 252—447 |
| 2,881,234 | 4/59 | Esmay | 252—447 |
| 2,965,624 | 12/60 | Anderson | 260—94.2 |

OTHER REFERENCES

"Modern Synthetic Rubbers" (Barron), Chapman and Hall Ltd., London, 1949, pp. 259–270 relied on.

JOSEPH L. SCHOFER, *Primary Examiner.*

M. LIEBERMAN, LEON J. BERCOVITZ, *Examiners.*